Figure 1:
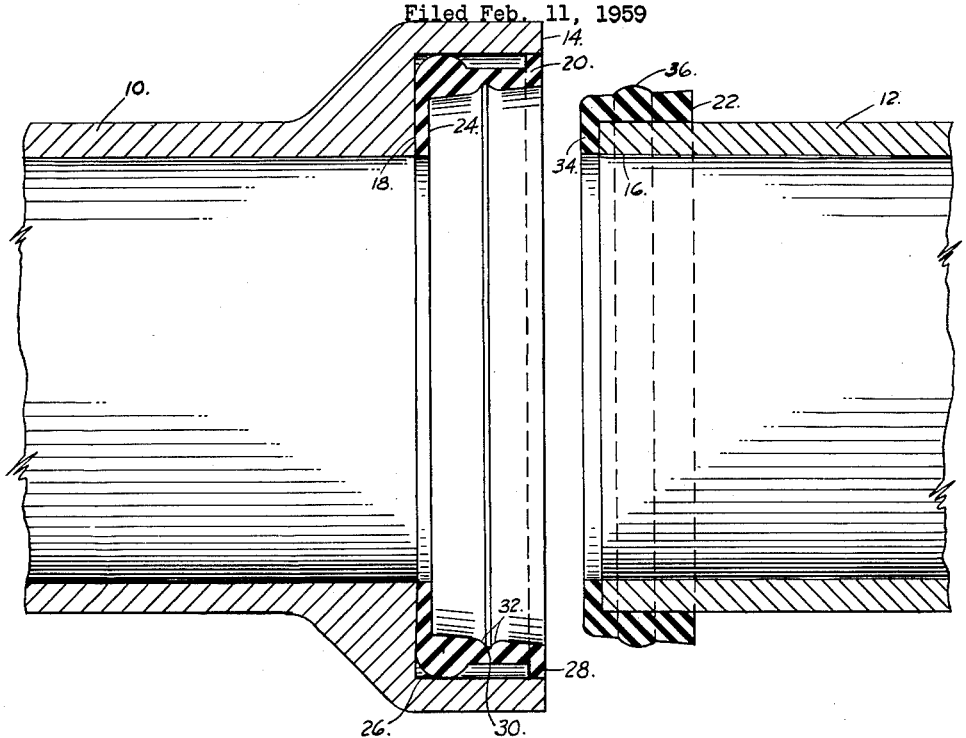

Oct. 23, 1962  R. S. KAYNOR ETAL  3,059,941
RESILIENT PIPE JOINT
Filed Feb. 11, 1959

INVENTORS
Richard S. Kaynor.
Emanuel B. Neuman.
BY
Paul M. Dehules
ATTORNEY.

United States Patent Office 3,059,941
Patented Oct. 23, 1962

3,059,941
RESILIENT PIPE JOINT
Richard S. Kaynor, Coral Gables, and Emanuel B. Neuman, Miami, Fla.; said Neuman assignor to said Kaynor
Filed Feb. 11, 1959, Ser. No. 792,550
2 Claims. (Cl. 277—190)

This invention relates to improvements in pipe joints, and more particularly, to resilient elements for joining and sealing pipe members of the bell and spigot type.

The primary purpose of the present invention is to provide a pipe joint comprising two independent resilient annular elements arranged to be inserted axially one within the other thereby forming a watertight joint by their interlocking and sealing action.

It is further the purpose of the present invention to provide a pipe joint of the character described comprising separate resilient elements which are manufactured independently of the pipe members and which may be installed on the pipe sections either in the field or at the time the pipe is manufactured, or any other feasible assembly place.

It is still further the purpose of the present invention to provide a pipe joint characterized by the flexibility of its structure which effects an efficient joint while compensating for irregularities in the contour or shape of the pipe and allowing for misalignment of the pipe sections during and after installation in their permanent position.

It is still further the purpose of the present invention to provide a pipe joint which is easy to install and does not require any special skill and tools or machinery or ovens, which is of simple construction and which is economical to manufacture.

A pipe joint constructed in accordance with the present invention comprises a pair of resilient sealing rings one of which is adapted to be inserted as a lining in the bell end of a pipe section and the other is adapted to be slipped as a collar over the spigot end of a pipe section, the lining ring having a generally cylindrical body formed with ridges or ribs on the outer wall thereof for sealing against the inner wall of the pipe bell end and a groove of convex side surfaces in the inner wall thereof. The collar ring has a generally cylindrical body formed with an annular ridge or rib of convex surface on the outer wall thereof adapted to engage and seal against the convex side surfaces of the groove in the lining ring thereby locking and sealing said rings together. The outer wall of the cylindrical body of the lining ring is disposed in centrally radially spaced relation to the inner wall of the pipe bell end for providing flexing of the wall without compression of the material thereof and conforming to the contour of the pipe bell end and permitting passage of the collar ring therethrough.

Figure 2:
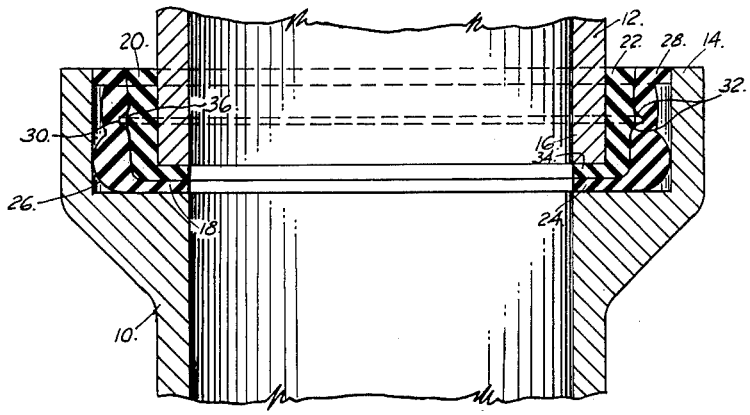

These and other features of the present invention are described in detail below in connection with the accompanying drawing, in which like numerals designate like parts, and in which:

FIGURE 1 is a longitudinal, central sectional view through adjoining pipe members of the bell and spigot type having coacting pipe joint members embodying the present invention positioned thereon; and FIGURE 2 is a view similar to that of FIGURE 1, but with the pipe members shown in connected position.

Referring now in detail to the drawin, there is shown as an embodiment of the present invention, a pipe joint adapted to join pipe sections or members 10 and 12 which usually are of ceramic composition, but may be of any material. These pipe sections are of duplicative construction, each having a bell or socket end 14 of a larger diameter and a spigot end 16, of a smaller diameter. This spigot end of one pipe section is adapted to fit into the bell end of the other pipe section in a telescopic assembly. The bell end 14 is formed with a bottom surface or shoulder 18 extending transversely to the longitudinal axis of the main cylindrical portion of the pipe, which pipe portion is of the same diameter as the spigot end.

The pipe joint comprises a pair of resilient sealing gasket rings 20 and 22, ring 20 being in the form of a lining adapted to be inserted within the bell end 14, and ring 22 being in the form of a collar adapted to be slipped over the spigot end 16, as shown in FIGURE 2. The gasket rings 20 and 22 may be composed of a vinyl composition or any other suitable flexible plastic or material which may be either injection molded or extruded. The rings 20 and 22 are molded or extruded independently of the pipes and they may be installed on the pipe sections 10 and 12 either before or during installation of the pipe.

As shown in FIGURE 1, the lining ring 20 has a generally cylindrical body formed with an inwardly radially directed or extending circular flange 24 having an outer substantially flat surface adapted to abut against the pipe shoulder 18 to which the flange 24 is adhesively permanently joined or bonded with any of the well known adhesives for such purpose. On the outer wall or surface, the lining ring 20 is formed with an annular ridge 26 of convex surface located at the inner end and adjoining the flange 24. The circumferential edge at the outer end of the ring 20 is formed with an annular outwardly directed flange or ridge 28. The outer annular ridges 26 and 28 are thus adapted to engage or seal against the inner wall surface of the bell end 14, while the outer wall of the body of the lining ring 20 extending between the ridges 26 and 28 is spaced from the inner wall of the bell end 14. The wall of the ring 20 may thus flex radially without compression of the material to conform to the contour or shape of the wall of the bell end 14 which is very often formed with irregular shape and to thereby afford a positive sealing action therebetween irrespective of the irregularities in shape of the bell. In order to secure the lining ring 20 within the ball end 14, adhesive is applied on the outer surface of the flange 24 bonding the same to the wall, the ring 20 is formed with a substantially V-shaped annular groove 30 located substantially centrally of the ring 20 and having radially extending opposed sides formed with convex surfaces, as indicated at 32, which surfaces are facing substantially radially of the ring 20 for a purpose as hereinafter described. The inner surface of the lining ring 20 may be slightly tapered inwardly to provide a tight fit and ease of assembly with the collar ring 22 on the spigot end 16.

The spigot end 16 of the pipe member 12 is adapted to be projected or inserted into the bell end 14 of the pipe member 10. The collar ring 22 has a generally cylindrical body terminating in an inwardly, radially directed flange 34 at the front end thereof. The flange 34 is adapted to abut or lie against the flange 24 when rings 20 and 22 are in a joint forming position. The outer surface of the ring 22 may be slightly tapered to conform to the tapered inner surface of the lining ring 20 for forming a tight sealing joint therebetween and ease of assembly.

On the outer wall, the collar ring 22 is formed with an annular, circumferential ridge 36 having a curved or convex surface, as shown in FIGURE 1. The annular ridge 36 is dimensioned to have radial and axial interference with the convex sides 32 of the groove 32 in the lining ring 20 between which it projects to provide a positive joining and sealing action therewith. The ring 22 is similarly, as the lining ring 20, adhesively secured or bonded to the pipe member 12 and this may be done either prior to or during installation of the pipe in the field.

Assembly of pipe sections with the gasket rings of the present invention is easily obtained by simply inserting each spigot end into the bell end of the adjoining pipe section with or without a lubricant but preferably with a lubricant for ease of insertion and fusion of the surfaces in contact. Entrance of the spigot end into the bell end is met with certain difficulty of opposition by the friction of the material between the surfaces of the rings and by the annular ridge 36 on the collar ring 22 projecting radially from the outer surface of the ring 22. The tapering of the walls of the rings 20 and 22 will permit entrance of about one third of the collar ring 22 within the lining ring 20. However, resistence will be offered to the further entrance of the ridge 36 on the collar ring 22 just before reaching the groove 30 in the lining ring 20. Since the material of the ring 22 cannot be compressed to any considerable extent for permitting passage of the collar ring 22 through the lining ring 20, the wall of the ring 20 being disposed in spaced relation with respect to the inner wall of the bell end 14 of the pipe member 10 is arranged to deflect radially outwardly until the ridge 36 is snapped in place between the curved walls 32 of the groove 30 in the lining ring 20. In this position, the shallow groove 30 being of smaller dimension than the ridge 36, the wall of the cylindrical lining ring 20 being deflected or stretched radially outwardly will be under tension and therefore exerts pressure against the ridge 36 thereby providing a complete contact between the curved surfaces of groove sides 32 and the curved surface of the ridge 36. By this arrangement, a strong sealing joint is provided between the rings 20 and 22 by the positive locking and sealing action of the groove side surfaces 32, on either side of the ridge 36, in compressive engagement with the outer surface of the ridge 36. Also, any misalignment between the pipe sections will not affect the sealing action of the joint since any or both of the convex sides 32 of the groove 30 will always be in engagement with the curved surface of the ridge 36. Also, the lining ring 20 having the intermediate portion of its cylindrical wall in spaced relation from the inner wall of the bell end of the pipe and engaging the inner wall of the bell end of the pipe only by its outer annular ridges 26 and 28, axially spaced apart thereon and offering minimum area of contact, is arranged to conform to the contour of the inner wall of the pipe bell end which may have any irregularities or warpage and to maintain a fluid tight joint. Furthermore, the pipe joint of the present invention has withstood pressures up to 45 p.s.i., while pressures of only 5-10 p.s.i. are usually required in joints of pipes of this type.

The present invention has been described in detail above for purposes of illustration only and is not intended to be limited by this description or otherwise except as defined in the appended claims.

What we claim is:

1. In a pipe joint for pipe members of the bell and spigot type, a pair of resilient sealing rings one being in the form of a lining positioned within the bell end and the other being in the form of a collar secured on the spigot end adapted to be received within the bell end of said pipe members, said rings each having a generally cylindrical body terminating at one end in an inwardly directed flange, said lining ring flange adhesively secured to a shoulder of the bell end of said pipe members, and said collar ring flange abutting said lining ring flange when received therein, said lining ring having an outer annular ridge of convex surface at said one end and an outer flange at the other end, said outer ridge and said outer flange sealing against the inner wall surface of said bell end, said lining ring having its outer body wall spaced from the inner wall of said bell end for radial deflection thereof to conform to the shape of the wall of said bell end without compression of the material of said lining ring, said lining ring having an inner annular groove of convex side surfaces, and said collar ring having an outer annular ridge of convex surface engaging and sealing against said groove convex side surfaces in said lining ring when said spigot end is received within said bell end thereby sealing and interlocking said rings together.

2. A sealing assembly for a pipe joint of the bell and spigot type; comprising a first resilient flexible sealing ring adapted to fit over the spigot end of a pipe, said first ring having at least one annular ridge having convex surfaces on its exterior and an inwardly radially extending portion adapted to fit over the end wall of the spigot end of a pipe; and a second resilient flexible sealing ring adapted to fit into the bell end of a pipe, said second ring having at least one annular groove having convex surfaces in the inner side wall of said ring substantially in the middle of said side wall, an annular raised bearing surface at each end of said ring and on the outer side wall thereof for bearing against an inner wall portion of a bell end of a pipe, and an end portion extending radially inwardly of said side wall adapted to bear against a radially extending shoulder in the bell portion of a pipe; said first ring adapted to sealingly engage said second ring when placed on the end of a spigot portion of a pipe and when said spigot portion is forced into a bell portion of a pipe having said second sealing ring mounted therein so that each said annular ridge locks into a groove.

References Cited in the file of this patent

UNITED STATES PATENTS

| Re. 24,651 | Anderson | May 19, 1959 |
| 2,260,542 | Shaffer | Oct. 28, 1941 |
| 2,445,963 | Montgomery | July 27, 1948 |
| 2,766,054 | Everhart | Oct. 9, 1956 |
| 2,767,697 | Rescheneder | Mar. 26, 1957 |

FOREIGN PATENTS

| 457,629 | Great Britain | Dec. 2, 1936 |
| 57,438 | France | Jan. 28, 1953 |
| 527,862 | Canada | July 17, 1956 |

UNITED STATES PATENT OFFICE
CERTIFICATE OF CORRECTION

Patent No. 3,059,941                                                October 23, 1962

Richard S. Kaynor et al.

It is hereby certified that error appears in the above numbered patent requiring correction and that the said Letters Patent should read as corrected below.

Column 2, line 41, for "ball" read -- bell --; line 43, before "wall" insert -- pipe shoulder 18, as shown in FIGURE 1. In the inner --; column 4, line 53, for "2,767,697" read -- 2,786,697 --.

Signed and sealed this 19th day of March 1963.

(SEAL)
Attest:

ESTON G. JOHNSON                                      DAVID L. LADD
Attesting Officer                                          Commissioner of Patents